Nov. 26, 1963 AKIO YANAGI ETAL 3,111,891
AUTOMATIC SHUTTER FOR CAMERA
Filed March 29, 1960 2 Sheets-Sheet 1
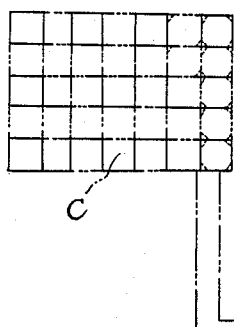
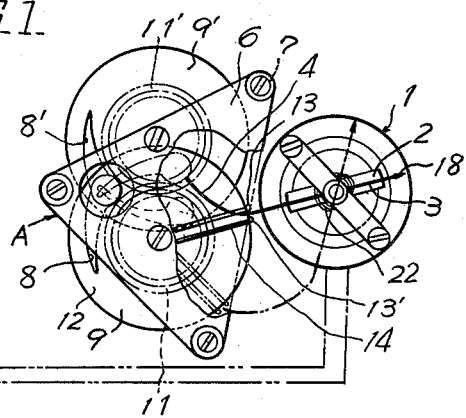
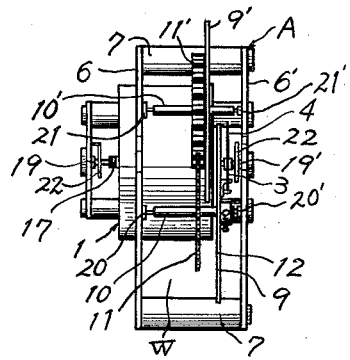
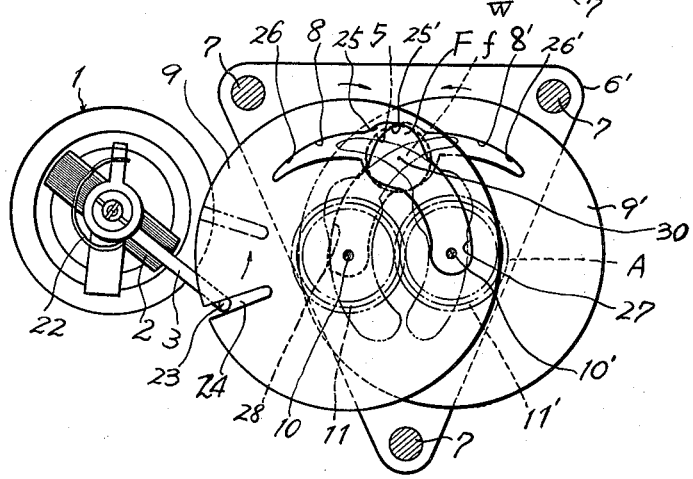

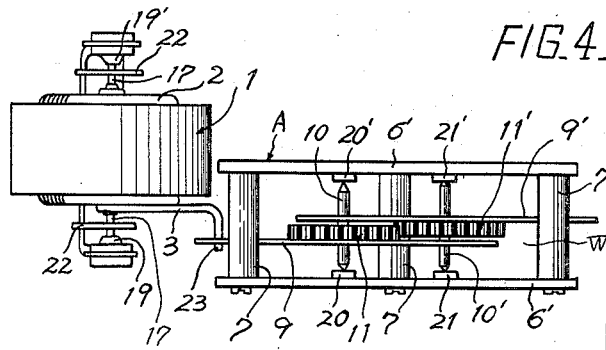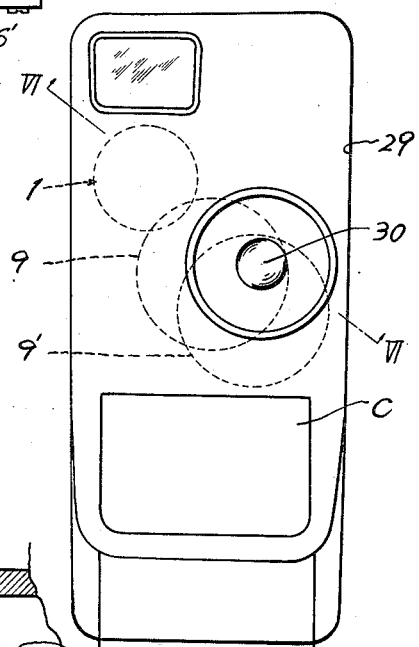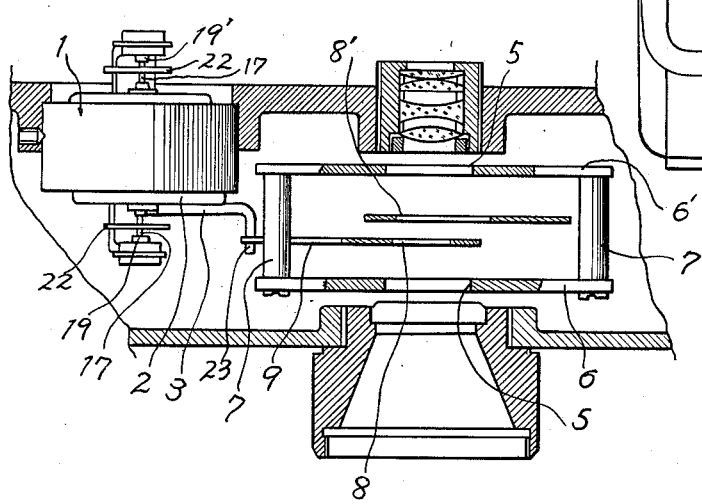

United States Patent Office 3,111,891
Patented Nov. 26, 1963

3,111,891
AUTOMATIC SHUTTER FOR CAMERA
Akio Yanagi, Sagamihara-shi, Kanagawa, Eiichi Furukawa, Tokyo, Takeshi Ataka, Sumiyoshi-ku, Osaka-shi, and Isamu Kubota, Hirakata-shi, Osaka-fu, Japan, assignors to Chiyoda Kogaku Seiko Kabushiki Kaisha, Osaka-shi, Japan, a corporation of Japan
Filed Mar. 29, 1960, Ser. No. 18,368
Claims priority, application Japan Mar. 31, 1959
4 Claims. (Cl. 95—64)

The present invention relates to an automatic shutter apparatus for a camera, and particularly to such a shutter apparatus for adapting a camera to photographing conditions by automatically setting a shutter valve suitable to instant exposure in accordance with the quantity of light received by an electric exposure meter.

Usually, an automatic shutter of this type comprises shutter blades in the form of toothed wheels having tooth forms directly cut therein, wherein a transmission mechanism is constituted by the meshing of those toothed wheels with intermediate gear wheels. Therefore, it has been necessary to make particular provision in order to compensate for characteristic properties of photocells. For instance, when the central distance between a supporting spindle of an electrical driving mechanism and a controlling spindle of a light controlling mechanism varies, it has been attempted to minimize the resulting effect by enlarging the module for the tooth form relatively to the diameter of the gear wheel used. This however increases the meshing friction of each wheel so that no smooth revolution could be accomplished. Hence, there has usually been the disadvantage of recurring errors in the determination of shutter value for the exposure condition.

The present invention overcomes the above-described disadvantages by providing an automatic shutter apparatus for a camera, wherein a movable electric coil rotates in accordance with the quantity of light received by photocells, the electric coil being interlocked with two shutter blades to turn them. The shutter blades overlap each other, and each contains a specially curved opening eccentrically disposed therein and symmetrically disposed with respect to the opening in the other shutter blade.

In accordance with this invention a movable coil of an electrical driving mechanism related to photocells is provided with an actuating rod; a curved portion of the actuating rod is designed to cooperate with a bifurcated fork-shaped arm portion of one shutter blade. Therefore, the actuating rod is shifted by the electrical driving mechanism which rotates to describe an arc, in response to the light quantity received by the photocells, and the curved portion of the actuating rod in turn operates the fork-shaped arm portion of a light controlling mechanism. Thus a shutter value corresponding to the light quantity received by the photocells is achieved by the shutter blade mounted on the controlling spindle to which the fork-shaped arm portion is secured, as well as by the other shutter blade in relation with the mechanism system for interlocking therewith. In the prior art the adjustment of exposure usually necessitates extremely complicated operations in photographing. However, according to the present invention, the appropriate value of exposure can be found automatically. Even when the brightness of the object to be photographed is abruptly altered, there is an advantage in that a proper exposure value can be obtained by merely directing the camera toward that object, because the exposure value always varies automatically according to the brightness, making it possible to obtain uniform photographing results.

Further, according to the present invention, the precisely finished, delicate bearing portion for the movable coils of the electrically driving portion can be protected from the impact added on the bearing during the operation by such an arrangement that the said actuating rod and one or both of the two arms of the bifurcated fork-shaped portion are made of flexible elastic material, and relative errors in the operation can be reduced. Thus, the present invention provides an advantage of attaining an accurate shutter value by smooth operation of shutter blades in cooperation with the compensation of characteristic behaviors of photocells.

Furthermore, according to the present invention, another advantage can be realized in that the weight and size of electrical driving mechanism can be reduced by improving the inertia of movable coils which is the most difficult feature in the design and manufacture of the driving mechanism.

Still further, according to the present invention, the engaging portion of the actuating rod attached to the movable coil operated by the photocells is arranged to engage in a groove in one of the two shutter blades having a curved shutter slot symmetrically and eccentrically positioned, and simultaneously the gear wheels provided respectively on said two shutter blades are arranged to interlock with each other. Accordingly, though operation of the movable coil is quickly responsive, it is not proportional to the shutter adjusting operation to comply with the outside light. Due to the characteristic properties of photocells, the breaking force of the coil spring and other interlocking friction, the present invention can be advantageously carried out readily by designing same in such a manner that the shutter slots or grooves, i.e. halting portions, or the curve of said engaging portion are formed appropriately.

In the following, the present invention will be described in further detail by reference to the two embodiments illustrated in the accompanying drawings, in which similar parts are designated by similar reference numerals throughout and wherein:

FIG. 1 is an elevation of an embodiment of this invention, with a part thereof cut away to reveal other parts;

FIG. 2 is a side view of the apparatus illustrated in FIG. 1;

FIG. 3 is an elevation of another embodiment of this invention, showing a part thereof in longitudinal section;

FIG. 4 is a side view of FIG. 3;

FIG. 5 is an elevation of a camera with apparatus according to the invention applied thereto; and FIG. 6 is a sectional view on the line VI—VI of FIG. 5.

Referring to FIG. 1 and FIG. 2, in which the first embodiment of this invention is shown, an actuating rod 3 is affixed to a freely rotating movable electrical coil 2 journalled in the magnetic field of an electrical driving mechanism 1, constructed in the form of an ammeter and connected across a group of photocells C. The actuating rod 3 has one end formed as a curved portion 4 and the other end formed as a counterweight 18. In this case, the actuating rod 3 is so arranged as to be at right angles to the pivot 17 of the movable coil 2, and the curved portion 4 is so arranged as to be in a plane in which the actuating rod 3 revolves.

A light-admitting window 5 (see FIG. 3) is opened through the required light controlling portion, and two frame plates 6, 6' are secured to a camera body (not illustrated) and are held in parallel relation with each other by spacer collars 7. Curved openings 8, 8' are provided symmetrically in thin sheets of material forming shutter blades 9, 9' pivoted in overlapping position within the clearance W between the frame plates 6, 6'. According to the invention, the curved openings 8, 8' are arranged in the respective shutter blades to open a light passage through the automatic shutter apparatus in line with the light-admitting window 5. It is noted that the curved openings 8, 8' are comma-shaped, in consequence of which the opening through the blades formed thereby as the blades turn is varied in size. The shutter blades 9 and 9' are secured respectively to controlling spindles 10, 10' which are journalled on the frame plates 6, 6' respectively. Further, gear wheels 11, 11' of similar diameter are provided on the controlling spindles 10 and 10', respectively. The shutter blade 9 has an exposed face 12 which does not overlap the other shutter blade 9' and which is provided with a fork-shaped arm 14 defining halting portions 13, 13' formed by turning its two ends at right angles thereto. In this case, two pins may be fixed to the shutter plates 9, 9' in the corresponding position in place of the fork-shaped arm portion 14 and the halting portions 13, 13'.

In the following description, the above-mentioned construction will be designated "light controlling mechanism A." Thus, the curved portion 4 of the actuating rod 3 of the electrical driving mechanism 1 is caused to be held between the halting portions 13, 13' of the fork-shaped arm portion 14 secured to the one controlling spindle 10 of the controlling mechanism A.

Operation of this embodiment is as described below:

The movable coil of the electrical driving mechanism 1 is revolved around a pivot 17 journaled on bearings 19, 19', by the electric current generated by the incident light quantity in the photocells C as shown in FIG. 1. Simultaneously the actuating rod 3, affixed to the movable coil 2, pushes the halting portions 13 or 13' which are provided at the front end of fork-shaped arm portion 14 of light-controlling mechanism A by its curved portion 4 to move the shutter blades. As a result the shutter blade 9 secured to the controlling spindle 10, which is journalled on bearings 20, 20', is turned from the full line position to the broken line position. Accordingly, as controlling spindle 10', journalled on bearings 21, 21', revolves, the other shutter blade 9' turns by a similar angle in the reverse direction to that of the shutter blade 9. As a result, the respective shutter blades 9, 9' form a shutter opening proportional to the incident light quantity by their curved shutter openings 8, 8'.

On the other hand, when the incident light quantity becomes zero, i.e. after the shutter value has been established, electric current will not flow through the electric circuit and the movable coil 2 will be returned to the starting position by the spring 22 secured to pivot 17. Thus, the actuating rod 3 will return to its original position.

In the operation referred to above, as the curved portion 4 of the actuating rod 3, affixed to the movable coil 2 of the electrical driving mechanism 1, is engaged respectively with halting portions 13, 13', the curve of curved portion 4 of actuating rod 3 is varied if necessary. Thereby the revolving relation between the revolution of the movable coil 2 and the revolution of shutter blades 9, 9' can be originated in a relation outside a linear proportional relation. Thus, when the curved portion 4 is formed with such a created curve, the compensation for the characteristic behavior of photocells, which it has been impossible to effect by meshing of the usual gear wheels, can be effected very simply. Even when the central distance between the pivot 17 of the movable coil 2 of the electrical driving mechanism 1 and the controlling spindle 10 of light-controlling mechanism A varies, a smooth operation can be effected independent of the transmitting action.

The second embodiment of the invention is illustrated in FIGS. 3, 4 and 6. In the embodiment of the invention illustrated in FIGS. 1 and 2 the curved portion 4 of the actuating rod 3 engages the halting portions 13, 13' of the fork-shaped arm portion 14. In this embodiment the curved end portion 23 of the actuating rod 3 is bent at its end at an angle of substantially 90° to the plane in which the rod revolves and engages a groove 24 formed in the shutter blade 9 itself extending radially inwardly from the circumference of the shutter blade.

The curved shutter openings 8, 8' are formed in the shutter blades 9, 9' eccentrically of the respective shutter blades and symmetrically with respect to each other. The opening of the intersecting portion is used as a shutter slot. Corresponding to said shutter slots, light-penetrating portions 5, 5' are provided in the side plates 6, 6'. In this case, the curved shutter openings 8, 8' in the shutter blades differ somewhat from those in the first embodiment in their shape, and the head portions 25, 25' of the respective slots 8, 8' are larger than those of the corresponding slots illustrated in FIG. 1, the slots shown in FIG. 3 being formed with curved openings 26, 26' of smaller width than those in the shutter blade slots shown in FIG. 1. When the shutter blades 9, 9' revolve, the curved central line (not illustrated) of both shutter slots always passes through the central line 30 of the light passage passing through the camera lens. Then, the turned end portion of the actuating rod is engaged with a groove 24 formed in either of the shutter blades 9 or 9' and extending radially inwardly from its circumference to provide by means of its edges another form of halting portions for engagement by the curved end 4 of the actuating rod 3. The movable coil 2 will be returned to the original position by spring 22, when the electric current fed to the electrical driving mechanism 1 is reduced.

The shutter blades 9, 9' overlap respectively after either one of the controlling spindles 10 or 10' has been passed as shown in FIG. 3. Hence, openings 27, 28, which are connected with head portions 25, 25' of curved shutter openings 8, 8', are provided in the shutter blades 9 and 9' for the purpose of providing clearances so that the spindles 10, 10' are not contacted by the shutter blades 9 and 9'. Those openings 27, 28 are not needed, in case the interaxial distance of controlling spindles 10, 10' are sufficiently large.

FIGS. 5 and 6 illustrate an example of this embodiment as attached to a camera. The photocells C provided in front of body 29 and the electrical driving mechanism 1 of the movable coil 2 held in the body 29 are connected with each other by an electrical circuit (not shown). The movable coil 2 of the electrical driving mechanism 1 is actuated by the current caused by the light received by photocells C, and when the actuating rod 3 is turned in the direction of the arrow as in FIG. 3, the curved shutter opening 8 will be turned in the direction of the arrow, because groove 24 is pushed by the bent portion 23 of actuating rod 3; accordingly shutter blade 9' will be turned in the direction shown by the arrow, by gear wheels 11, 11'.

Accordingly, each respective curved shutter opening 8, 8' having formed a large shutter opening F by the intersecting of the large openings of head portions 25, 25', then form a small shutter opening f by the intersecting of narrower shutter portions shown by broken lines. According to the amount of light quantity received by photocells C, the actuation of movable coils 2 varies, and correspondingly the shutter opening establishes itself an appropriate shutter automatically.

Thus, in this embodiment as described above, as the revolution of the movable coil 2 is transmitted to either shutter blade 9 or 9' directly, the operation is quickly responsive. The operation of the movable coil 2 is by no means proportional to the shutter adjusting operation, where the shutter value should be adjusted by the characteristic properties of photocells and the breaking force of spring 22 actuated thereby and the interlocking friction with shutter blades. However, this can be done by suitably designing the shape of the curved openings 8, 8'.

Two embodiments of the invention are described in this specification by way of illustration. Other forms and modifications of the invention, coming within the proper scope of the appended claims, are of course contemplated in the invention.

What is claimed is:

1. An automatic shutter apparatus for a camera comprising a photocell responsive to the quantity of light in the direction in which the camera is pointed, a movable electric coil, an electric circuit between said photocell and said coil for turning said coil in accordance with the response of said photocell to the quantity of light in the direction in which the camera is pointed, an actuating rod attached to said coil for turning therewith, said rod having a curved end disposed in a plane in which said rod revolves, two overlapping shutter blades each rotatable to pass through the central line of light passage through the camera lens, parallel spindles upon which said shutter blades are mounted, meshing gear wheels of similar diameter on said spindles whereby said shutter blades rotate together in opposite direction, said shutter blades having comma-shaped curved openings eccentrically and symmetrically formed therein to provide a passage therethrough of variable size for passage of light from the camera lens, and halting portions fixed with respect to a point on the circumference of one shutter blade engaged by the curved end of said actuating rod, whereby a proper exposure value is obtained by directing the camera toward the object to be photographed.

2. An automatic shutter apparatus as claimed in claim 1 wherein said shutter blades and said gear wheels are of light construction, and wherein said actuating rod is made of flexible elastic material whereby said shutter blades may be rotated.

3. An automatic shutter apparatus as claimed in claim 1 wherein a fork-shaped arm portion rotates with one of said shutter blades and extends radially thereof, and wherein said halting portions constitute ends of said arm portions turned at right angles thereto.

4. An automatic shutter apparatus for a camera comprising a photocell responsive to the quantity of light in the direction in which the camera is pointed, a movable electric coil, an electric circuit between said photocell and said coil for turning said coil in accordance with the response of said photocell to the quantity of light in the direction in which the camera is pointed, an actuating rod attached to said coil for turning therewith, said rod having a curved end bent at an angle of substantially 90° to the plane in which said rod revolves, two overlapping shutter blades each rotatable to pass through the central line of light passage through the camera lens, parallel spindles upon which said shutter blades are mounted, meshing gear wheels of similar diameter on said spindles whereby said shutter blades rotate together in opposite direction, said shutter blades having comma-shaped curved openings eccentrically and symmetrically formed therein to provide a passage therethrough of variable size for passage of light from the camera lens, and halting portions fixed with respect to a point on the circumference of one shutter blade, said halting portions comprising the longitudinal edges of a groove extending radially inwardly from the circumference of the shutter blade engaged by the curved end of said actuating rod, whereby a proper exposure value is obtained by directing the camera toward the object to be photographed.

References Cited in the file of this patent

UNITED STATES PATENTS

| 2,421,499 | Guedon | July 3, 1947 |
| 2,841,064 | Bagby et al. | July 1, 1958 |

FOREIGN PATENTS

| 698,573 | Great Britain | Oct. 21, 1953 |